US005531162A

United States Patent [19]
Iwamoto

[11] Patent Number: 5,531,162
[45] Date of Patent: Jul. 2, 1996

[54] PRESS PLATE REGISTERING METHOD

[75] Inventor: Masayuki Iwamoto, Shizuoka, Japan

[73] Assignee: Shinohara Machinery Co., Ltd., Shizuoka, Japan

[21] Appl. No.: 205,134

[22] Filed: Mar. 1, 1994

Related U.S. Application Data

[63] Continuation of Ser. No. 976,171, Jan. 13, 1992, abandoned.

[51] Int. Cl.$^6$ .............................. B41F 27/00; B41F 13/12
[52] U.S. Cl. .......................................... 101/171; 101/486
[58] Field of Search ................................. 101/485, 486, 101/481, 415.1, 378, 401.1, DIG, 36, 171, 211; 33/614, 615, 616, 617–620, 621

[56] References Cited

U.S. PATENT DOCUMENTS

| | | | |
|---|---|---|---|
| 3,160,096 | 12/1964 | Norton | 101/DIG. 36 |
| 4,485,447 | 11/1984 | Ericsson | 101/DIG. 36 |
| 4,489,652 | 12/1984 | Takeuchi et al. | 101/DIG. 36 |
| 5,117,365 | 5/1992 | Jeschke | 101/481 |

*Primary Examiner*—J. Reed Fisher
*Attorney, Agent, or Firm*—Ladas & Parry

[57] ABSTRACT

A method of registering press plates on plate cylinders used in a sheet-fed press for multicolor printing, in which register information is obtained by using edges of the press plates as references. Each press plate is stretched around a plate cylinder with its front edge and one side edge abutted against gripping references on the plate cylinder. A press plate register measuring device similarly uses the edges of the press plate as references, with the press plate in the same positional relationship as on the press cylinder. On the measuring device deviations between references marks on the plates and benchmark references are measured and utilized to adjust the position of the plate cylinders to bring the printing plates into registered printing positions.

21 Claims, 5 Drawing Sheets

5,531,162

PRESS PLATE REGISTERING METHOD

This is a continuation of application Ser. No. 07/976,171, filed on Nov. 13, 1992, now abandoned.

BACKGROUND OF THE INVENTION (a) Field of the Invention

The present invention relates to a sheet-fed press used for multicolor printing and, more particularly, to a press plate registering method wherein register information is obtained by using the edges of press plates as references.

(b) Description of the Prior Art

In a sheet-fed press for multicolor printing, press plates are respectively wound around as many plate cylinders as the number of colors used in the printing process, and printing is sequentially carried out for each color. In this case, high printing quality cannot be obtained unless each color printing is made sequentially at the correct position on a sheet of paper. Accordingly, a registering operation is conducted for each of the plurality of plate cylinders.

Register errors may be classified as parallel misregister where color plates are out of register in parallel to the axial and/or circumferential direction of the plate cylinder, and distortion errors which occur when an undesired shift in the axial direction of the plate cylinder is combined with misregister in the circumferential direction of the plate cylinder.

If registering is effected while printing is carried out with press plates actually attached to the respective plate cylinders, a large number of sheets of paper are wasted. Therefore, such a registering method is uneconomical, and it also involves a great loss of time and requires skill in the registering operation.

Japanese Patent Laid-Open No. 229268/1992 discloses a technique in which a press plate is registered on the basis of cross-shaped marks (register marks), which are reference marks put on the press plate, and the press plate is attached to a plate cylinder by using a U-shaped hole made by punching.

However, the disclosed technique provides no register information about alignment between a plurality of press plates used for multicolor printing, although it is convenient for attaching a press plate to a plate cylinder. Accordingly, it is still necessary to carry out a registering operation after printing separately. In addition, the measuring device itself needs a punch, a centering mechanism and a press plate moving mechanism and hence becomes complicated and costly.

SUMMARY OF THE INVENTION

In view of the above-described problems, it is an object of the present invention to provide an improved press plate registering method, which eliminates the need for a registering operation after printing, thereby allowing press plates to be registered without special skill, and which enables a measuring device required therefor to be simplified in arrangement and reduced in cost, and further which makes it possible to store digital information about registering of a plurality of press plates used for multicolor printing so that the information can also be utilized for reprinting.

To attain the above-described object, the present invention provides a press plate registering method wherein a plate cylinder (12) has a pair of clamps (16) and (18) for front and rear gripper ends, by which a press plate (10) is stretched around the plate cylinder (12). The clamp (16) for the front gripper end is provided with gripping references (20) and (22) for circumferential and axial directions of the plate cylinder (12), which use edges of the press plate (10) as references. A press plate register measuring device (14) is also provided with measuring references (26) and (28) for the circumferential and axial directions of the plate cylinder (12), which similarly use the edges of the press plate (10) as references, with the same positional relationship as that of the gripping references (20) and (22). A plurality of press plates (10), produced by plate-making process, are placed sequentially on the press plate register measuring device (14) with edges of each press plate (10) brought into contact with the measuring references (26) and (28) to measure distances between reference marks (32) of each plate (10) and the corresponding measuring references (26) and (28). Then, register information is obtained by determining differences between the measured values of one of the press plates (10) that is defined as a reference press plate and the measured values of the other press plates, and a series of plate cylinders (12) are registered on the basis of the register information.

According to the method of the present invention, the edges of the press plate (10) are used as measuring and gripping references. Therefore, measurement can be made simply by placing the press plate (10) on the press plate register measuring device (14). Thus, the measuring device can be simplified and reduced in cost to a great degree. In addition, since register measurement is made with the same positional relationship as that established when the press plate (10) is attached to the plate cylinder (12), no registering operation is needed after printing. Thus, the press plate (10) can be set by a single registering operation. In addition, digital information for registering, which is obtained by the method of the present invention, is very useful not only for reprinting but also for realizing a registering operation that requires no special skill.

The above and other objects and features of the present invention will become apparent from the following description of the preferred embodiment thereof, taken in conjunction with the accompanying drawings. However, it should be noted that the following embodiment is merely an illustrative example, and the present invention is not limited thereto.

DESCRIPTION OF THE PREFERRED EMBODIMENT

Figure 1:
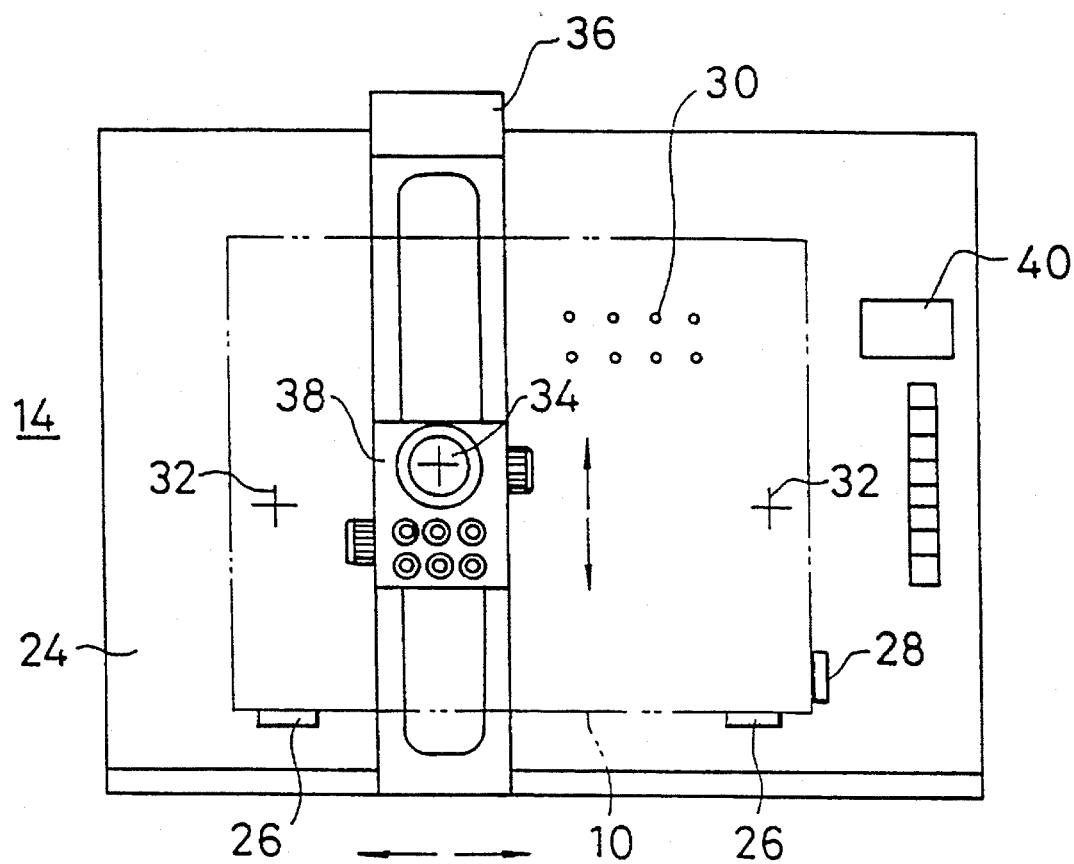
FIG. 1 is a plan view of a press plate register measuring device used for the press plate registering method according to the present invention.

For multicolor printing, press plates 10, e.g., PS plates, are prepared respectively for a plurality of colors, for example, black, cyan, magenta, and yellow. These press plates 10 are attached to a sheet-fed printing press having a plurality of printing units, and hence plate cylinders 12, to effect a printing operation. According to the method of the present invention, register information about the press plates 10 is input to the printing press from a press plate register measuring device 14 which is in the form of a table, as shown in FIG. 1, thereby registering the press plates 10 which are to be wound around the respective plate cylinders 12. Upon completion of the registering operation, an actual printing operation is commenced in a state where there is no register error, such as parallel misregister between a plurality of press plates 10, or distortion.

Figure 2:
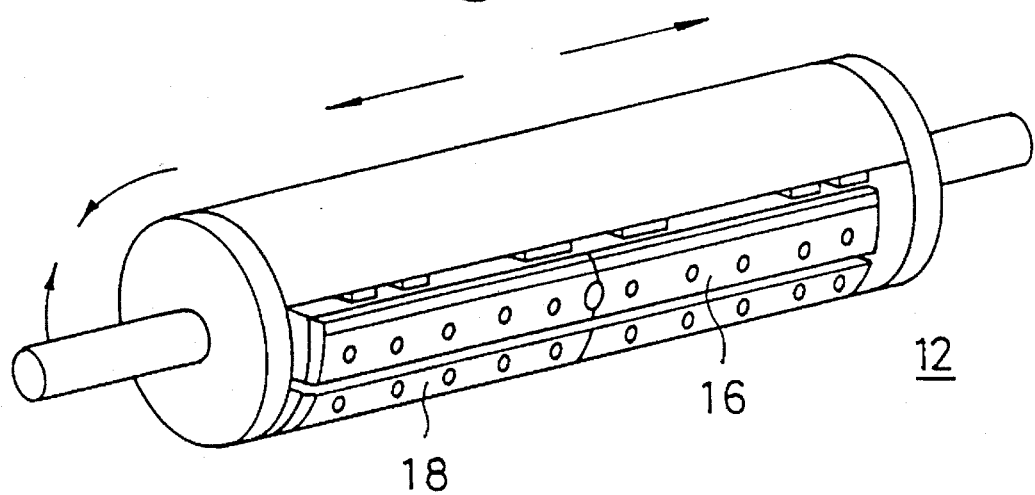
FIG. 2 is a perspective view of a plate cylinder.
Figure 3:
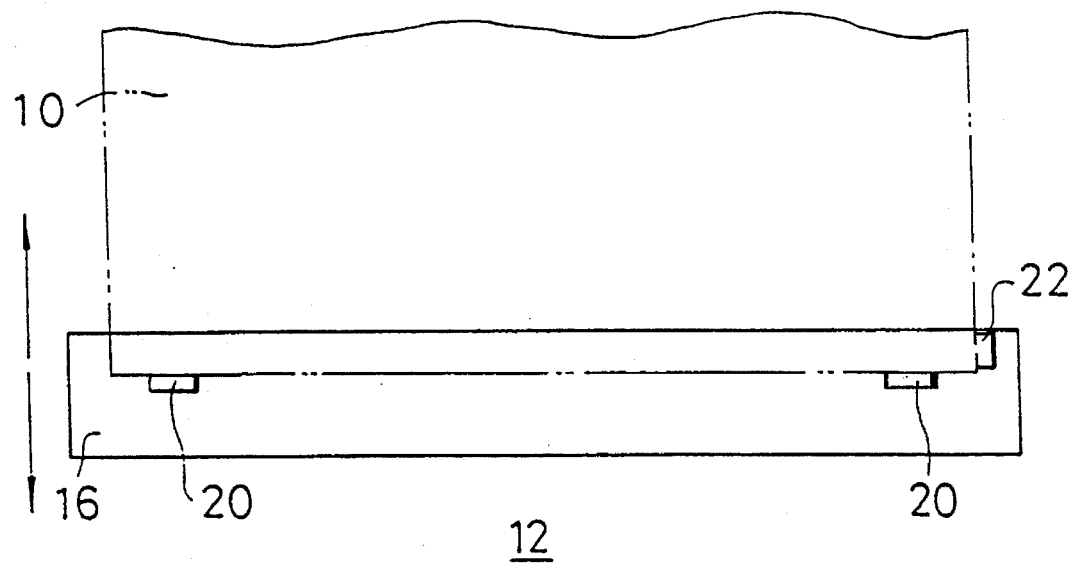
FIG. 3 is a fragmentary plan view of a plate cylinder for which the method of the present invention is carried out.

As is generally known, the plate cylinder 12 has a groove, and a pair of clamps 16 and 18 for gripping front and rear gripper ends of a press plate 10 are provided in the groove. With the two ends of the press plate 10 gripped by the respective clamps 16 and 18, the press plate 10 is stretched and wound around the plate cylinder 12. It should be noted that in the following description the direction of the axis of the plate cylinder 12, shown in FIG. 2, is described as horizontal, while the direction of rotation (i.e., circumferential direction) of the plate cylinder 12 is described as vertical.

To carry out the method of the present invention, first, the clamp 16 for the front gripper end must be provided with gripping references 20 and 22 for the vertical and horizontal directions, which use the edges of the press plate 10 as references. Specifically, the gripping references 20 and 22 may be stopper projections that are provided on the clamp base of the clamp 16 for the front gripper end. Since the gripping references 20 and 22 serve as references used when the press plate 10 is attached to the plate cylinder 12, they must be disposed with high accuracy by taking into consideration the size and other necessary factors of the press plate 10. In any event, when the press plate 10 is to be attached to the plate cylinder 12, the edges of the press plate 10 are brought into contact with the gripping references 20 and 22, and in this state, the press plate 10 is positioned in both the vertical and horizontal directions. Then, the two ends of the press plate 10 are gripped.

In the meantime, the press plate register measuring device 14, shown in FIG. 1, has a flat table-like measuring board 24 as a principal constituent member. The measuring board 24 is also provided with measuring references 26 and 28 for vertical and horizontal directions, which similarly use the edges of the press plate 10 as references, with the same positional relationship as that of the above-described gripping references 20 and 22. The term "the same positional relationship" is herein employed to mean that the layout and spacing of the gripping references 20 and 22 are the same as those of the measuring references 26 and 28. Specifically, these measuring references 26 and 28 may also be stopper projections that are provided on the measuring board 24. Therefore, the movement of the press plate 10 in the X-direction (horizontal direction as viewed in the figure) on the register measuring device 14 is limited by the measuring reference 28, while the movement in the Y-direction (vertical direction as viewed in the figure) is limited by the measuring references 26. In addition, a number of vacuum holes 30 are provided in the measuring board 24 to secure by suction the press plate 10 to the measuring board 24 by making a vacuum act on the reverse side of the press plate 10.

Incidentally, the left and right margins of the press plate 10 are usually printed with cross-shaped reference marks 32, known as register marks, when a pattern is printed on the press plate 10 from the original plate film. Since the register marks directly reflect the accuracy with which the original plate film is made, they can serve as reliable references for registering the press plate 10. The method of the present invention aims at obtaining data for registry by precisely measuring the positions of the pair of right and left register marks on the press plate 10. A reader 34, which has an optical register mark reading means and various scales and counters as principal constituent elements, is mounted on a Y-axis slider 38 which, in turn, is movably mounted on an X-axis slider 36. The X-axis slider 36 is slidable only in the X-direction (horizontal direction as viewed in the figure) of the measuring board 24, while the Y-axis slider 38 is movable only in the Y-direction (vertical direction as viewed in the figure) on the X-axis slider 36. Accordingly, the resultant movement of these two movements allows the reader 34, which is mounted on the Y-axis slider 38, to scan freely the surface of the press plate 10 secured to the surface of the measuring board 24 to thereby measure the positions of the reference marks 32. It should be noted that reference numeral 40 denotes a display for displaying measured values and other necessary information.

It is assumed that four different press plates 10 are prepared for multicolor printing, as shown in FIGS. 4 to 7 (the press plates 10 shown in these figures will be referred to as "first, second, third and fourth plates", respectively). These press plates 10 are sequentially placed on the measuring board 24, and the edges of each press plate 10 are brought into contact with the measuring references 26 and 28. After the press plate 10 has been suction-secured by means of a vacuum applied through the vacuum holes 30, the reader 34 commences measurement of the left and right reference marks 32. It is assumed that the position of the reference mark 32, which is on the right-hand side as viewed in the figures, is at a distance X1 from the measuring reference 28 and at a distance Y1 from the measuring references 26, and the position of the left-hand reference mark 32 is offset from the position Y1 by a distance T1 in terms of the Y-direction. For the other press plates 10, the corresponding distances are similarly denoted by X2, Y2 and T2, and so forth.

In registering press plates for multicolor printing, it is only necessary to correct misregister between a plurality of press plates. Therefore, registering should be made in such a manner that one of the four press plates 10, for example, the first plate, which is shown in FIG. 4, is assumed to be a reference press plate whose reference marks 32 serve as benchmarks, and the second and other press plates are lined up with the reference press plate so that no misregister occurs.

Figure 4:
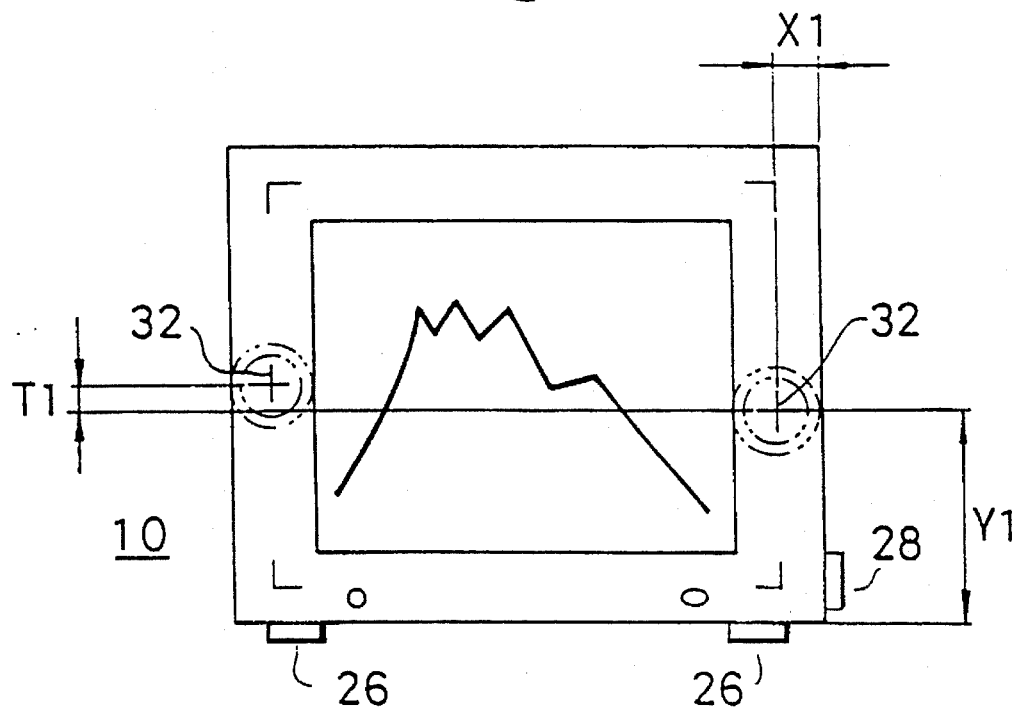
FIGS. 4 to 8 are plan views showing measurement for register by the method of the present invention.
Figure 5:
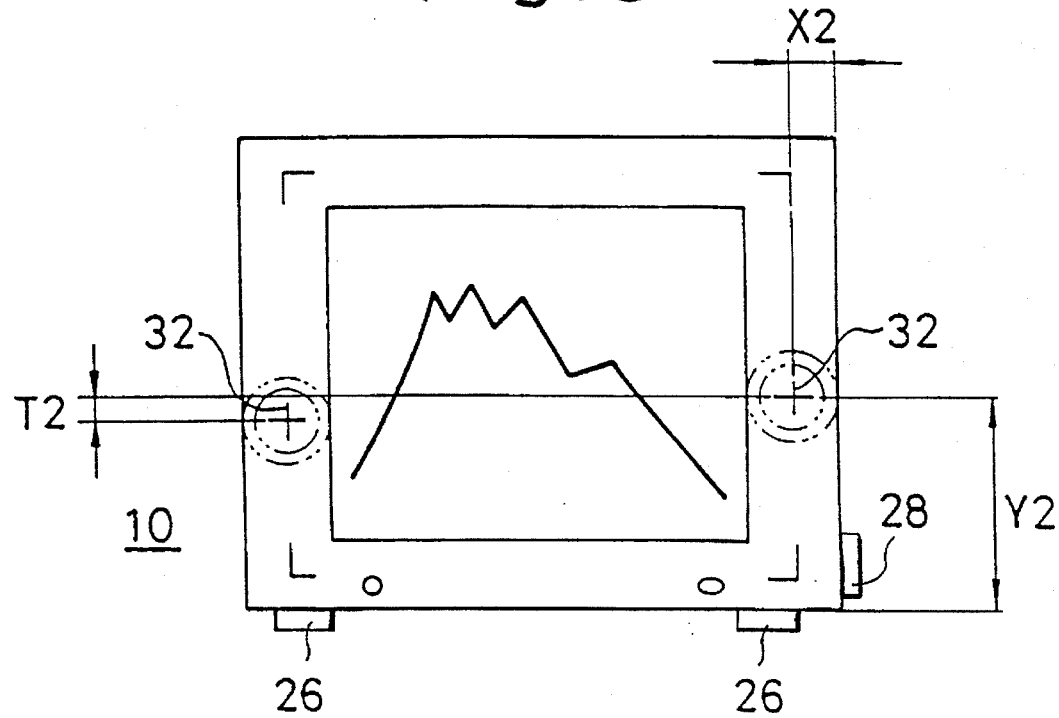
Figure 6:
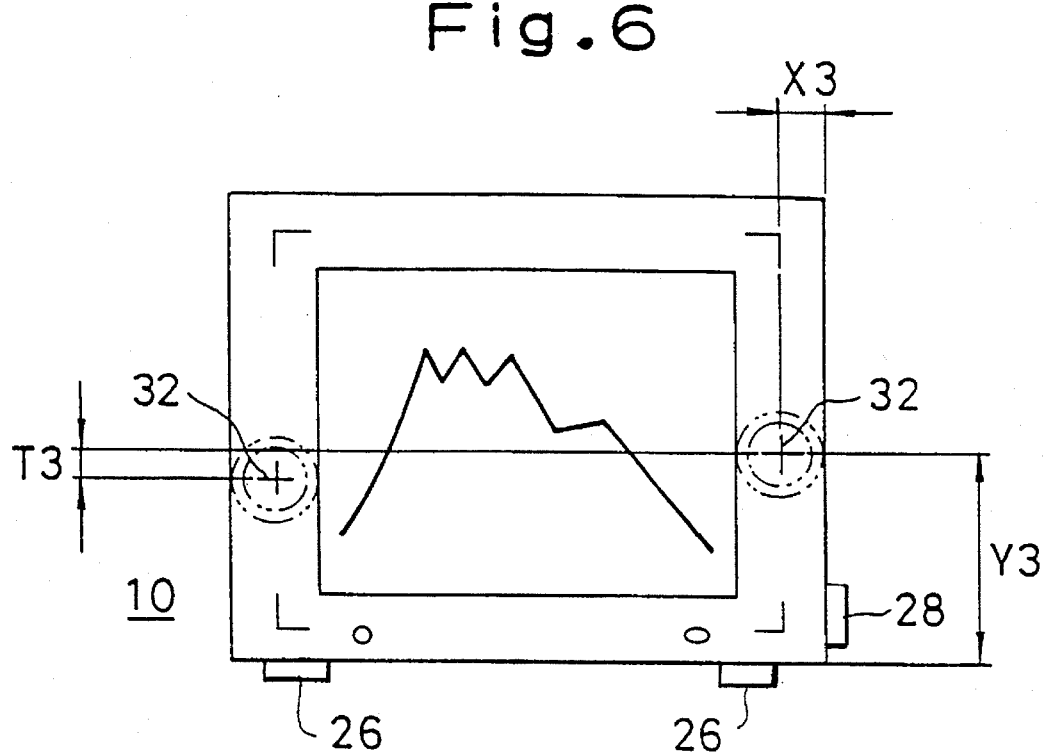
Figure 7:
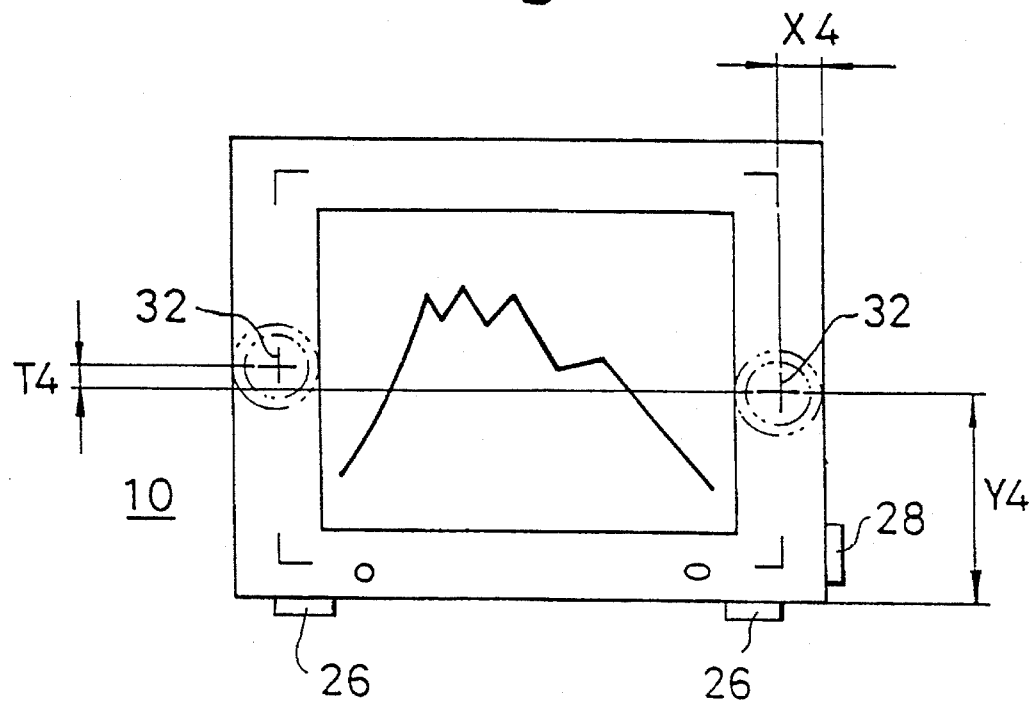

Thus, the following values are obtained by subtraction as errors in the vertical direction with respect to the first plate, shown in FIG. 4, i.e., A1=0 (because the first plate is the reference press plate), A2=Y1−Y2, A3=Y1−Y3, and A4=Y1−Y4. Further, as errors in the horizontal direction, B1=0, B2=X1−X2, B3=X1−X3, and B4=X1−X4 are obtained. As distortion errors, T1, T2, T3 and T4 can be employed as they are.

These calculated values are utilized as register information for registering each plate cylinder 12. In application of the method of the present invention, registering may be effected by cocking the plate cylinder 12 itself. Alternatively, registering may be effected by so-called plate cocking in which the press plate 10 wound around the plate cylinder 12 is moved. The essential thing is to form the above-described gripping references 20 and 22 on the clamp 16 for the front gripper end, which is provided on the plate cylinder 12. With the gripping references 20 and 22, the register measuring operation for the press plate 10 and the gripping operation are effected with the same positional relationship. Therefore, it is possible to set the press plate 10 by a single registering operation without special skill simply by carrying out the registering operation after the measuring and gripping operations according to the register information about the alignment between a plurality of press plates 10. This also applies in a case where the edges of a press plate 10 are a little deformed. This is because the measuring operation and the gripping operation are carried out with the same positional relationship for each individual press plate 10, as described above.

Figure 8:
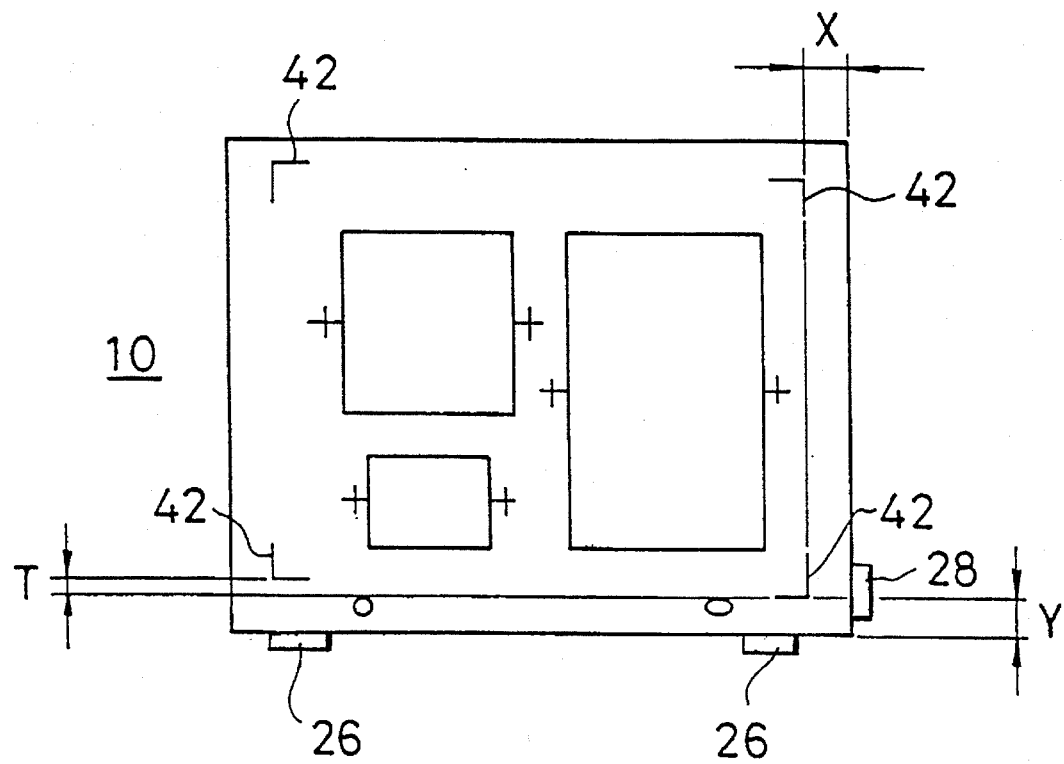

It should be noted that some press plates 10 may have a layout in which a plurality of patterns are formed, as shown in FIG. 8, unlike those which have a single pattern, as shown in FIGS. 4 to 7, and it is therefore more preferable to utilize L-shaped register marks 42, which are provided at the four corners, as reference marks than to use the cross-shaped register marks 32. In this case also, measurement should be made by using the register marks 42 as reference marks in the same way as the above.

The method of the present invention of registering press plates, enables the required register measuring device to be substantially simplified and allows one to set a press plate by a single registering operation. Thus, it is possible to facilitate the registering operation, which has heretofore required many man-hours. In addition, register information, which is once formed into numerical data, can also be utilized for reprinting. Thus, the present invention contributes greatly to rationalization of the printing operation carried out using a sheet-fed press.

It should be noted that the present invention is not limited to the embodiment described above and that various changes and modifications may be imparted thereto.

I claim:

1. In a method wherein register information about a plurality of press plates (10) is utilized in a sheet-fed press, which has a plurality of plate cylinders (12) for multicolor printing, from a press plate register measuring device (14), for thereby registering said press plates (10) which are to be attached to said plate cylinders (12), respectively, each plate cylinder (12) having a pair of clamps (16) and (18) for gripping front and rear ends of a press plate by which the press plate (10) is stretched around said plate cylinder (12), an improvement comprising:

providing said clamp (16) for the front end with gripping references (20) and (22) in the circumferential and axial directions of said plate cylinder (12), which references cooperate with edges of said press plate (10);

providing said press plate register measuring device (14) with measuring references (26) and (28) corresponding to the circumferential and axial directions of said plate cylinder (12), which similarly cooperate with the edges of said press plate (10) with the same positional relationship as that of said gripping references (20) and (22);

sequentially placing a plurality of press plates (10), produced by a plate-making process, on said press plate register measuring device (14) with edges of each press plate (10) brought into contact with said measuring references (26) and (28), and measuring distances between reference marks (32) of each press plate (10) and the corresponding measuring references (26) and (28);

obtaining register information by determining differences between the measured values of one of said press plates (10) that is defined as a reference press plate and the measured values of the other press plates; and registering a series of plate cylinders (12) on the basis of said register information.

2. The improvement as claimed in claim 1, wherein said plate cylinders are registered on the basis of said register information by adjusting the position of the plate cylinder for each press plate.

3. The improvement as claimed in claim 2, wherein the position of each plate cylinder is adjusted by cocking the plate cylinder.

4. The improvement as claimed in claim 1, wherein the differences between the reference marks on each press plate and the measuring references is effected by measuring said differences in X and Y orthogonal directions.

5. The improvement as claimed in claim 4, wherein said differences in the X and Y directions are measured by aligning with said measuring references a slider which is movable in the X and Y directions.

6. The improvement as claimed in claim 5, comprising holding said press plates on said measuring device by suction.

7. The improvement as claimed in claim 1, wherein said measuring references and said gripping references are formed as accurately placed projections having aligning edges at right angles to one another.

8. In a method of attaching press plates to press cylinders in registered positions for accurate multicolor printing in which the press plates are first measured in a measuring device and then front and rear edges of the press plates are attached to front and rear clamping means on the press cylinders on the basis of the measurements in the measuring device, the improvement comprising:

providing gripping references on the front clamping means of each press cylinder to engage one end edge and one side edge of a press plate to establish axial and circumferential positioning of said press plate on said press cylinder;

providing measuring references on said measuring device which correspond to said gripping references on the front clamping means of each press cylinder;

engaging said one end edge and said one side edge of the press plate with said measuring references;

measuring on said measuring device deviation of reference marks on each said press plate from benchmark reference marks; and adjusting the press cylinder on the basis of said deviation to bring the press plate into a registered printing position.

9. A method as claimed in claim 8, comprising effecting said measuring of said deviation of said reference marks on each said press plate with said press plate in the same positional relation on said measuring device and on said press cylinder.

10. A method as claimed in claim 8, wherein said benchmark reference marks are obtained by utilizing the reference marks on a selected, arbitrary one of said press plates.

11. A method as claimed in claim 8, wherein said measuring references and said gripping references are formed as accurately placed projections having aligning edges at right angles to one another and against which said edges of said press plates are abutted.

12. A method as claimed in claim 9, wherein the adjusting of the press cylinder comprises cocking the press cylinder.

13. In a method of multicolor printing in a sheet-fed press having a plurality of press plates mounted on respective plate cylinders, wherein the press plates are first measured in a measuring device and thereafter registry of the press plates in the press is effected on the basis of measurements obtained in said measuring device, each plate cylinder having front and rear clamping means for engaging front and rear edges of a corresponding press plate stretched around the plate cylinder, the improvement comprising:

providing gripping references on the front clamping means of each plate cylinder to engage one end edge and one side edge of a respective press plate to establish axial and circumferential positioning of said press plate on said plate cylinder, providing measuring references on said measuring device in precise correspondence with the gripping references on said front clamping means of each plate cylinder, engaging said one end edge and said one side edge of each press plate with said measuring references on said measuring device, measuring deviations of reference marks on each press plate from benchmark reference marks when said one end edge and said one side edge on each press plate are engaged with said measuring references, and adjusting the position of each press plate in the press to substantially eliminate measured deviations of the reference marks on the press plates from the benchmark reference marks whereby to obtain registry of the press plates.

14. The improvement as claimed in claim 13, wherein the adjusting of the position of each press plate in the press is effected by adjusting the respective plate cylinder in the press.

15. The improvement as claimed in claim in claim 14, wherein the adjusting of the respective plate cylinder in the press is effected by cocking the plate cylinder in the press.

16. The improvement as claimed in claim 13, wherein said benchmark reference marks are obtained by utilizing reference marks on a selected arbitrary one of said press plates.

17. The improvement as claimed in claim 13, wherein said measuring references and said gripping references are formed as accurately placed projections having aligning edges at right angles to one another and against which said edges of said press plates are abutted.

18. The improvement as claimed in claim 13, wherein the deviation of reference marks on the press plates from the benchmark reference marks is effected by measuring said deviations in X and Y orthogonal directions.

19. The improvement as claimed in claim 13, wherein the deviations of the reference marks from the benchmark reference marks is effected by measuring distances of the reference marks and the benchmark reference marks, in X and Y orthogonal directions, from said measuring references and evaluating differences between the measured distances, in X and Y orthogonal directions, between the reference marks and the benchmark reference marks.

20. A method for achieving registry of a plurality of press plates in a sheet-fed press for multicolor printing, said method comprising:

providing a respective plate cylinder for each of a plurality of press plates which are to successively carry out multicolor printing in a sheet-fed press, providing identical gripping references on the front clamping means of each plate cylinder, to engage one end edge and one side edge of a respective press plate to establish axial and circumferential positioning of the press plate on the plate cylinder.

providing measuring references on a measuring table in precise correspondence with the gripping references on said front clamping means of said plate cylinders, providing reference marks on each press plate in correspondence with a printing pattern on the press plate, engaging said one end edge and said one side edge of each press plate with said measuring references on said measuring table, establishing as benchmark reference marks, the reference marks on a selected one of said press plates with said one end edge and said one side edge thereof engaged with said measuring references, and measuring deviations of the reference marks of the other of the press plates from said benchmark reference marks when the end edge and side edge of each of the other of the press plates are engaged with the measuring references, engaging the front and rear edges of each press plate with the front and rear clamping means of the respective plate cylinder and with its said one end edge and its said one side edge engaged with the gripping references on said front edge, and engaging each plate cylinder in the press in an adjusted position based on the measured deviation of the reference marks of the corresponding press plate from said benchmark reference marks to eliminate said deviation and thereby obtain registry of the press plates and the printing produced by the printing patterns thereon.

21. A method as claimed in claim 20, wherein the deviations of the reference marks from the benchmark reference marks are determined by measuring distances of the reference marks and the benchmark reference marks, in X and Y orthogonal directions, from said measuring references and evaluating differences between the measured distances, in X and Y orthogonal directions, between the reference marks and the benchmark reference marks.

* * * * *